United States Patent [19]

Suzuki

[11] 4,051,483
[45] Sept. 27, 1977

[54] SYSTEM FOR MEASURING AND RECORDING THREE DIMENSIONAL CONFIGURATION OF OBJECT

[75] Inventor: Masane Suzuki, Omiya, Japan

[73] Assignee: Fuji Photo Optical Co., Ltd., Omiya, Japan

[21] Appl. No.: 720,383

[22] Filed: Sept. 3, 1976

[51] Int. Cl.² ............... G01D 9/00; B43L 13/16; G01C 11/12; G01B 11/30

[52] U.S. Cl. ............... 346/33 A; 346/29; 33/20 D; 356/2; 356/120; 364/564

[58] Field of Search ......... 346/29, 33 A; 33/20 D; 356/2, 120; 250/237 G; 235/151

[56] References Cited

U.S. PATENT DOCUMENTS

| | | | |
|---|---|---|---|
| 2,759,814 | 8/1956 | Kegelas | 356/2 X |
| 2,896,501 | 7/1959 | Stamps | 33/20 D X |
| 2,910,910 | 11/1959 | Rosenfeld et al. | 356/2 |
| 3,614,237 | 10/1971 | Kyle et al. | 356/2 UX |
| 3,614,410 | 10/1971 | Bailey et al. | 346/29 X |
| 3,866,052 | 2/1975 | Di Matteo et al. | 356/2 X |

*Primary Examiner*—George H. Miller, Jr.
*Attorney, Agent, or Firm*—Harold L. Stults

[57] ABSTRACT

An encoder for converting a distance to an electric signal is connected with a computer to put a distance signal into the computer. Th encoder is put on a moire pattern obtained by interference between a standard grating and a deformed image of the standard grating deformed by the surface of a three dimensional object. The distance between moire fringes is put into the computer. The computer is supplied with a signal indicting whether the surface is convex or concave. The depth or height of a point on the moire pattern is calculated by the computer, and a contour of the three dimensional object is obtained. An X-Y recorder is connected with the computer to draw the contour of the object.

2 Claims, 5 Drawing Figures

SYSTEM FOR MEASURING AND RECORDING THREE DIMENSIONAL CONFIGURATION OF OBJECT

BACKGROUND OF THE INVENTION

This invention relates to a system for measuring and recording the three dimensional configurations of an object, and more particularly to a system for measuring and recording the surface configuration and calculating the cross-sectional area of a three dimensional object by use of moiretopography combined with an electronic computer.

Conventional moiretopographic methods for obtaining the cross-sectional area and the cross-sectional line length of a three dimensional object are laborious and time consuming.

SUMMARY OF THE INVENTION

The primary object of the present invention is to provide a novel system for measuring the cross-sectional line length and the cross-sectional area of a three dimensional object in a very short time and with little labor.

Another object of the present invention is to provide a system for recording the three dimensional contour of an object in contour lines at a high speed and with high accuracy.

Still another object of the present invention is to provide a system for measuring the surface area of a three dimensional object with high efficiency.

The system in accordance with the present invention is characterized in that moiretopography is combined with an electronic computer. More concretely, in the present invention, an electronic computer is supplied with a first signal indicative of the intervals of moire fringes formed on a moire recording film, a second signal indicative of the magnification of the moire recording optical system and a third signal which indicates whether the surface of the object measured is convex or concave. The computer is connected with an X-Y recorder which records the calculated information in contour lines on a recording sheet. Said first signal indicative of the moire fringe intervals is obtained by an encoder which is located on the moire formed and recorded on a film.

DESCRIPTION OF THE PREFERRED EMBODIMENT

Now, the invention will be described in detail with reference to a particular embodiment shown in FIGS. 1 to 5.

Figure 1:
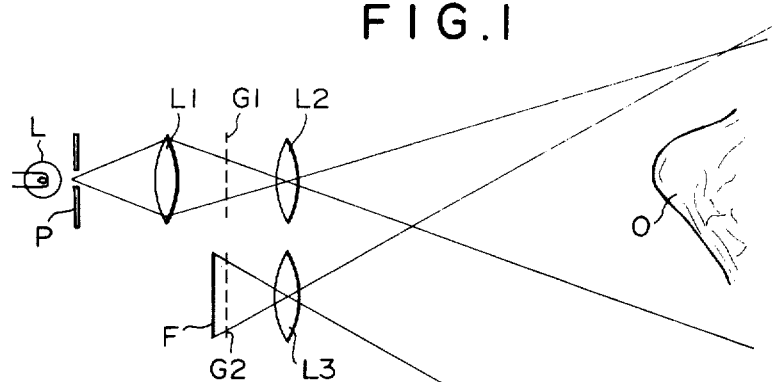
FIG. 1 is a schematic side view showing the optical arrangement for forming a moire of a three dimensional object on a photographic film.

Referring to FIG. 1, a pin hole plate P is located in front of a light source L to obtain an approximated point light source. A standard grating G1 is located in front of the pin hole plate P between two lenses L1 and L2. The image of the standard grating G1 is projected on an object O and deformed thereon. The deformed image of the grating is further projected on a photographic film F by way of a focusing lens L3. Another standard grating G2 is placed on the film F and the deformed image of the standard grating G1 interferes with the second standard grating G2, and accordingly, a moire pattern is recorded on the film F.

Figure 2:
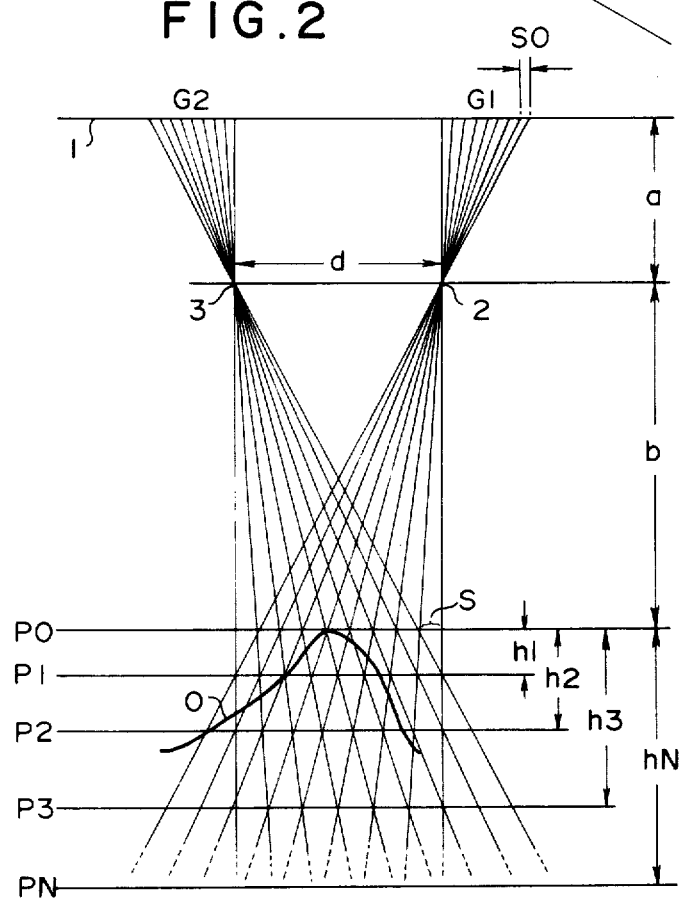
FIG. 2 is an explanatory view showing the principle of the method of calculation for obtaining the depth of the moire fringes.

From the moire pattern thus recorded can be obtained the depth or height of the surface of the object. FIG. 2 shows the method of calculating the depth or height of the surface of the object from the moire pattern. Referring to FIG. 2, a standard grating plane 1 on which the gratings G1 and G2 are located and the principal plane on which the principal points 2 and 3 of the lenses L2 and L3 are located are arranged in parallel to each other at an interval of $a$. The principal points 2 and 3 are separated from each other by the distance of $d$. The grating constant of the standard gratings G1 and G2 is indicated by S0. The second grating G2 and the image of the first grating G1 interfere with each other and a moire pattern is formed. The standard height of the moire pattern which is represented by a moire fringe is indicated by a plane P0. The first moire fringe counted from the standard height is indicated by P1. The N-th moire fringe counted from the standard height P0 is indicated by PN. The distance between the first fringe P1 and the standard height P0 is indicated by $h1$, and the distance between the N-th fringe PN and the standard height P0 is indicated by $hN$. The standard height or level P0 of the moire fringe and the principal plane of the lenses L2 and L3 are separated by the distance $b$. On the standard level P0, the grating constant S0 is projected in the size of S. Where the focal length of the lenses L2 and L3 is represented by $f$, the distance between the N-th fringe PN and the standard height P0 is represented by the following formula, $$hN = N \cdot S \cdot b / (d - N \cdot S) \tag{1}$$

because $(hN + b) : b = d : (d - N \cdot S)$.

The formula (1) can be rewritten in the following form, $$hN = b(b - f)N \cdot S0 / [fd - (b - f)N \cdot S0] \tag{2}$$

because $S = S0 \times b/a = S0 (b - f)/f$.

In the above formula (2), $b$, $f$, $d$ and $S0$ are determined by the dimensions of the optical device used for recording the moire pattern. Therefore, if the distance between moire fringes is known for a particular fringe, the depth or level of the point of the fringe can be calculated by the formula (2). Accordingly, the contour of the object can be obtained.

Figure 3:
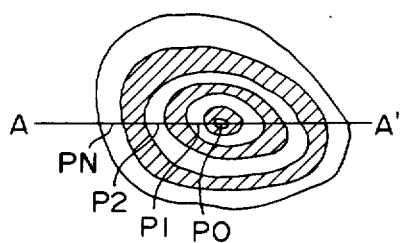
FIG. 3 is a view of a moire formed on a film employed in the system of the invention.

FIG. 3 shows an example of a photograph of the moire wherein the standard height or point is indicated by P0 and the N-th fringe is indicated by PN. The cross-section taken along the line A–A' is obtained by the system in accordance with the present invention.

Figure 4:
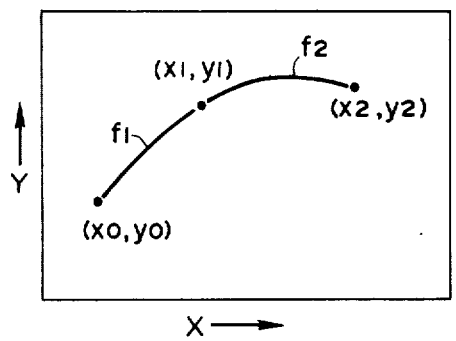
FIG. 4 is a graphical representation of a contour line drawn by an X-Y recorder connected with a computer in the system of the invention.
Figure 5:
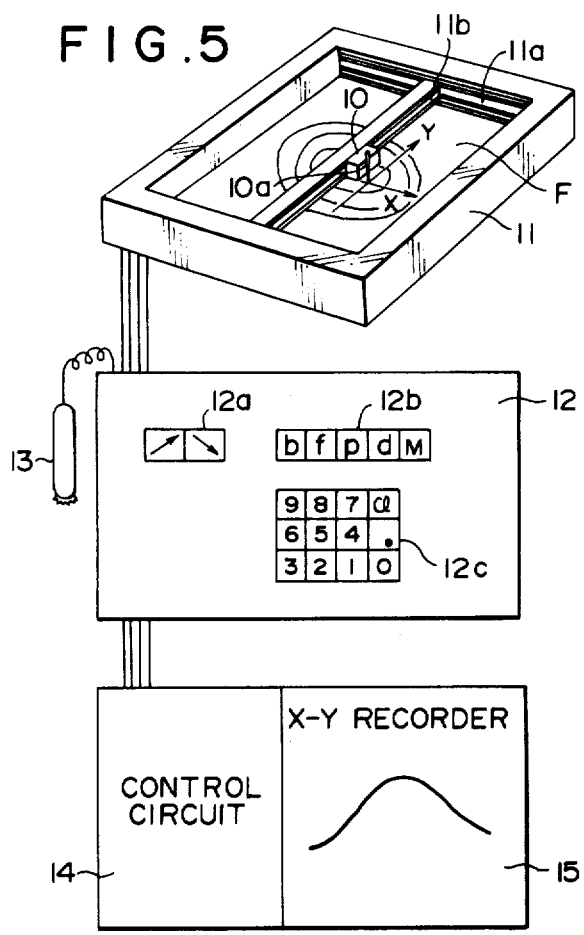
FIG. 5 is a schematic view showing an embodiment of the system for measuring and recording the three dimensional contour of an object in accordance with the present invention.

FIG. 5 shows the whole system of the present invention in which an encoder 11 is connected with computer 12. The encoder 11 is provided with a detecting head 10 movable in the X and Y directions and converts the position of the detecting head 10 into an electric signal. The movement of the head 10 in the X-direction is controlled by a belt 11a and the movement thereof in the Y-direction is controlled by a belt 11b. The detecting head 10 has a pointer 10a which is moved along the surface of a film F carrying a moire recorded thereon. The computer 12 is provided with a first switch button 12a for input of a signal indicating whether the surface of the object represented by the moire is convex or concave. The computer 12 is further provided with function keys 12b and decimal keys 12c for input of various constants of the formula (2). In case where a computer provided with memorizing means which memorizes the various constants is used, these keys 12a and 12b for input thereof are unnecessary. Further, if desired, the computer 12 may be provided with indicating means for indicating the cross-sectional area and the cross-sectional line length. Further, a Kilby pen 13 is provided in the computer 12 for scanning along the contour of a sectional view of the object obtained by the computer and obtaining the sectional line length. The computer 12 is connected to an X-Y recorder 15 for drawing the contour or cross-section of the object in accordance with the output supplied from the computer 12 by way of a control circuit 14. The control circuit 14 functions to smooth out the incremental output of the computer 12. For instance, as shown in FIG. 4, when the curve having the points $(x_0, y_0)$ and $(x_1, y_1)$ is approximated with an equation $f_1(x)$, the next curve $f_2(x)$ is approximated with an equation which satisfies the conditions that $f'_1(x_1) = f'_2(x_1)$ and $f_2(x_2) = y_2$, i.e. satisfies the conditions that the gradient of the curve $f_2$ is equal to that of the curve $f_1$ at the point $(x_0, y_0)$ and that the curve $f_2$ has the point $(x_2, y_2)$. In a similar manner, the approximation of a curve having the points output from the computer 12 is made.

In operation of the above described system, the encoder 11 is put on the film F carrying recorded thereon a moire of a three dimensional object, and the pointer 10a of the detecting head 10 is moved along a section line corresponding to said line A–A' to convert the distance between adjacent moire fringes to an electric signal. Simultaneously, a signal which indicates whether the surface of the object is convex or concave is put into the computer 12 with the switch button 12a. The various constants such as b, f, SO, d and M (M: correction constant for the magnification of the grating projection optical system) are put into the computer in advance so that the information representing the distance between adjacent moire fringes will be calculated to output the depth or level of the point at the fringes in accordance with the formula (2). Based on the calculated depth or level of the points, the cross-sectional line length and the cross-sectional area are computed, and the contour of the cross section is drawn with the X-Y recorder 15 along the section line A–A'.

From the accumulation of the cross-sectional areas taken along the X-direction in the Y-direction can be obtained the volume of the object. Further, by drawing the cross-sectional contours with the original point thereof slightly shifted successively, a bird's eye view can be obtained. Further, by connecting a paper tape puncher to the computer, it is possible to obtain a tape carrying punched data indicative of the coordinates of the moire pattern. Of course, the tape carrying such information can be used for performing higher analysis.

I claim:

1. A three dimensional contour measuring system for measuring and recording the contour of a three dimensional object comprising an encoder for measuring the distance between adjacent moire fringes of a moire obtained by the interference between a standard grating and a deformed image of a standard grating deformed by the surface of a three dimensional object, a computer connected with said encoder for calculating the depth or height of a point on the object on one moire fringe with respect to the depth or height of a point on the object on the moire fringe adjacent to said one moire fringe, signal input means provided in said computer for input of a signal which indicates whether the surface of the object represented by the moire fringes is convex or concave, magnification input means provided in said computer for input of a signal which indicates the magnification of an optical system for projecting the image of the standard grating on the surface of the object, and an X-Y recorder connected with said computer for recording the output of the computer, whereby said X-Y recorder records the contour of the three dimensional object and said computer computes the cross-sectional area and the cross-sectional line length of the object.

2. A system as defined in claim 1 wherein a control circuit for smoothing out the output of the computer is connected between said computer and said X-Y recorder to make an approximation of a curve lying between adjacent points output from the computer.

* * * * *